United States Patent [19]

Abileah et al.

[11] Patent Number: 5,161,041

[45] Date of Patent: Nov. 3, 1992

[54] LIGHTING ASSEMBLY FOR A BACKLIT ELECTRONIC DISPLAY INCLUDING AN INTEGRAL IMAGE SPLITTING AND COLLIMATING MEANS

[75] Inventors: Adiel Abileah, Farmington Hills; Charles Sherman, Royal Oak; Robert M. Cammarata, Sterling Heights, all of Mich.

[73] Assignee: OIS Optical Imaging Systems, Inc., Troy, Mich.

[21] Appl. No.: 514,737

[22] Filed: Apr. 26, 1990

[51] Int. Cl.$^5$ ............................................. G02F 1/1335
[52] U.S. Cl. ........................................ 359/40; 359/49
[58] Field of Search .................. 350/334, 345; 359/40, 359/49

[56] References Cited

U.S. PATENT DOCUMENTS

| | | | |
|---|---|---|---|
| 4,171,874 | 10/1979 | Bigelow et al. | 350/345 |
| 4,616,295 | 10/1986 | Jewell et al. | 350/345 |
| 4,660,936 | 4/1987 | Nosker | 350/339 D |
| 4,686,519 | 8/1987 | Yoshida et al. | 350/345 |
| 4,704,004 | 11/1987 | Nosker | 350/345 |
| 4,798,448 | 1/1989 | van Raalte | 350/345 |
| 4,915,479 | 4/1990 | Clarke | 350/345 |
| 4,936,659 | 6/1990 | Anderson et al. | 350/339 D |
| 4,984,872 | 1/1991 | Vick | 350/345 |

FOREIGN PATENT DOCUMENTS

| | | | |
|---|---|---|---|
| 0030875 | 6/1981 | European Pat. Off. | |
| 2471012 | 6/1981 | France | 350/345 |
| 0066862 | 5/1979 | Japan | |
| 0201326 | 10/1985 | Japan | 350/334 |
| 0110422 | 5/1988 | Japan | |
| 0118125 | 5/1988 | Japan | 350/334 |
| 2198867 | 6/1988 | United Kingdom | |
| 8808149 | 10/1988 | World Int. Prop. O. | 350/345 |

OTHER PUBLICATIONS

3M Scotch TM Optical Lighting Film Application Bulletin Thin Light Box, Preliminary Nov. 1988.
3M Scotch TM Optical Lighting Film General Theory, Preliminary Nov. 1988.
"Polarized Backlight for LCD" Technical (IBM) Disclosure Bulletin; vol. 33, No. 1B, Jun. 1990.

*Primary Examiner*—Stanley D. Miller
*Assistant Examiner*—Anita Pellman Gross
*Attorney, Agent, or Firm*—Myers, Liniak & Berenato

[57] ABSTRACT

An improved lighting assembly for a backlit electronic display includes an integrally formed image splitting-/collimating lens for effectively enlarging the area illuminated by any one or part of one of the lamps of the source of backlighting. Through the use of the improved optical assembly described herein, there is provided a backlit electronic display characterized by fewer lamps, reduced heating, and vastly improved intensity of illumination per unit area in a lower profile package.

22 Claims, 4 Drawing Sheets

LIGHTING ASSEMBLY FOR A BACKLIT ELECTRONIC DISPLAY INCLUDING AN INTEGRAL IMAGE SPLITTING AND COLLIMATING MEANS

FIELD OF THE INVENTION

The instant invention relates generally to the field of electronic two dimensional liquid crystal displays, which displays are adapted to provide either still or video images to a remotely positioned viewing audience. The instant invention more particularly relates to the field of backlit liquid crystal displays particularly adapted for military and avionic applications and which are specially designed to present a bright, uniform distribution of light to said viewing audience in a low profile, i.e., minimum depth assembly.

The unique and improved backlit module disclosed in the instant specification finds an important use in full color active matrix liquid crystal displays, particularly those adapted for military and avionic use. This module achieves about one order of magnitude improvement in a figure of merit (FOM) described by the function: FOM =(lamp power/viewing angle) * (backlight thickness/ lamp life), which improvement has been achieved by decreasing the needed lamp power thereby resulting in an increase in lamp life. Additionally, the lighting arrangement set forth in the instant invention features a redundant configuration, intense illumination, uniform illumination, thermal control of the lamps and thin packaging.

BACKGROUND OF THE INVENTION

In recent years, a considerable amount of research has been conducted in an effort to develop a low profile (thin), full color, electronic display system which does not rely upon conventional cathode ray tube technology. In systems such as television receivers, computer monitors, avionic displays, aerospace displays, and other military-related displays, the elimination of cathode ray tube technology is desirable for several reasons, which reasons will be detailed in the following paragraphs.

More particularly, cathode ray tubes are typically characterized by extremely large depth dimensions and thus occupy a considerable amount of floor or counter space. As a matter of fact, the depth dimension may equal the length and width dimensions of the viewing screen. Also, because cathode ray tubes require an elongated neck portion to provide for the acceleration of an electron beam from the electron gun to the faceplate of the cathode ray tube, they are quite irregular in shape. Additionally, since cathode ray tubes are fabricated from relatively thick glass, they are inordinately heavy, extremely fragile and readily breakable. Finally, cathode ray tubes require a relatively high voltage power supply in order to sufficiently accelerate the electron beam and thus sustain the displayed image.

The reader can readily appreciate the fact that all of the foregoing problems experienced with or shortcomings of cathode ray tubes are exacerbated as the size of the viewing screen increases. Since the current trend, and in fact consumer demand, is toward larger screens; weight, breakability, placement, etc. represent significant commercial considerations. Accordingly, it should be apparent that cathode ray tubes are and will continue to be inappropriate for those applications in which weight, fragility and portability are important factors.

One system which can eliminate all of the aforementioned shortcomings of the present day cathode ray tube is the flat panel liquid crystal display in which a matrix array of liquid crystal picture elements or pixels are arranged in a plurality of rows and columns. Liquid crystal displays may typically be either reflective or transmissive. A reflective display is one which depends upon ambient light conditions in order to be viewed, i.e., light from the surrounding environment incident upon the side of the display facing the viewer is reflected back to the viewer. Differences in the orientation of the liquid crystal material within each liquid crystal pixel cause those pixels to appear either darkened or transparent. In this manner, a pattern of information is defined by the two dimensional matrix array of darkened (or transparent) pixels. However, and as should by now be apparent, reflective liquid crystal displays cannot be used in a dark or low light environment since there is no light available for reflection off the viewing surface of the display.

Conversely, transmissive liquid crystal displays require the use of illuminating means such as a lamp array operatively disposed on the side of the matrix array of picture elements opposite the viewer. This illumination means or backlight may further include a backreflector adapted to efficiently redirect any stray illumination towards the matrix array of rows and columns of picture elements, thus ensuring that the displayed image is as bright as possible (given the lighting capabilities and characteristics of the backlighting scheme being employed). The instant invention is specifically directed to the field of backlit, high resolution liquid crystal electronic displays.

The characteristics of the backlighting scheme are very important to both the quality of the image displayed by the matrix array of picture elements of the liquid crystal display and the profile, i.e., the thickness dimension, of that liquid crystal display. Accordingly, a great deal of the aforementioned research in the field of said flat panel electronic displays has been dedicated to the design and fabrication of backlighting systems which optimize certain viewing and structural parameters of those flat panel displays. Characteristics which are acknowledged by experts as the most important in the design of optimized backlighting assemblies include: 1) uniformity across the large surface areas illuminated by the light provided by the backlight, i.e., the intensity of the light must be substantially the same at each pixel of the large area liquid crystal display; 2) high brightness illumination provided by the backlight thus yielding a sharp, readily readable image to a remotely positioned viewing audience; 3) a low profile so that a flat panel liquid crystal display is substantially flat and can be operatively disposed for viewing without occupying an undue amount of available space; 4) the overall design of the backlight which takes into consideration the number, configuration, and redundancy of lamps; 5) the heat effect caused by the number, configuration, redundancy and type of the lamps; and 6) the total power consumed by the lighting scheme which represents an extremely important consideration in hand held (portable) television units.

A number of different backlight configurations, all of which included a plurality of discrete optical components disposed between the plane of the source of backlit radiation and the plane of the matrix array of liquid crystal pixels, have been designed in an effort to maximize each of the desirable characteristics recited hereinabove. For example, those of ordinary skill in the art of liquid crystal display backlighting have attempted to use light diffusers in an effort to achieve a more uniform distribution of projected light across the entire viewing surface of the liquid crystal display. This technique, while useful for improving the uniformity of projected light, deleteriously affected the intensity of that projected light resulting in light appearing soft or washed-out. Thus, additional lamps were required when such light diffusers were employed, resulting in an increased heating effect upon the display. Further, due to the fact that such light diffusers were, of necessity, positioned an operative distance from both the source of backlighting as well as from the matrix array of liquid crystal pixels, the depth dimension or profile of the electronic, flat panel display was significantly increased.

A second technique employed to enhance the quality of the backlight (and hence the quality of the displayed image) is to operatively dispose a light collimating lens, such as a fresnel lens, between the source of the backlight and the matrix array of liquid crystal picture elements. This design expedient has the effect of producing an intense, sharp image from a minimal number of lamps, while simultaneously providing a high degree of uniformity of projected radiation across the entire viewing surface of even large area displays. However, due to the nature of collimated light, the viewing angle of a display equipped with such a light collimating lens is limited. Indeed, viewing of the displayed image is impossible from any angle other than directly straight-on. Accordingly, a backlit display which employs only a light collimator without a mechanism for increasing the viewing angle has limited commercial applicability, and is wholly inappropriate for the gigantic markets related to television and computer monitors. Additionally, collimating means, such as fresnel lenses, are characterized by an operative focal length. (The focal length is that distance from the light source at which said lens must be disposed in order to properly collimate light emanating from said light source.) Thus, the light collimator has the undesirable effect o increasing the profile of the liquid crystal display. Also, backreflectors are inappropriate for use with light collimating. This is because light reflected from the backreflector does not originate from a position which is at the focal length of the collimating lens. Hence, light reflected from said backreflector will not be collimated. This results in localized bright spots on the surface of large area displays, degrading the quality of the displayed image.

In a effort to achieve the advantages of both light collimation and light diffusion, routineers in the backlit, flat panel liquid crystal display art have attempted to incorporate both a discrete light diffuser and a discrete light collimator into the same backlit liquid crystal display. Optically speaking, the results have been satisfactory only to the extent that the quality of the displayed image is relatively sharp, intense and uniform; while said image is visible over a relatively wide viewing angle. However, in order to maximize the optical effect of utilizing the diffuser-collimator combination, it was necessary to operatively space the collimator from the source of backlighting radiation, and then to space the diffuser from both the plane of the collimator and the plane of the matrix array of liquid crystal pixels. The result was a substantial increase in the profile, i.e., the depth dimension of the liquid crystal display. Indeed, in typical liquid low profile crystal display systems which include both a light collimator and a light diffuser, the distance from the light source to the diffuser is approximately 17 millimeters. It can thus be seen that by including both diffusing and collimating optical components, the profile of a typical flat panel liquid crystal display is significantly increased, thus eliminating one of the principle advantages of liquid crystal display systems; i.e., compactness. One method of reducing the depth profile and providing the foredescribed improved optical effect is disclosed in copending United States patent application No. 473,039, filed Jan. 31, 1990, assigned to the assignees of the instant application, the disclosure of which is incorporated herein by reference.

While the commonly assigned and copending application improved the profile and optical characteristics of prior art electronic displays having a given figure of merit for intensity of illumination per unit area, that application did not deal with improvements in the lighting efficiencies so as to reduce the number of lamps, the thermal effects of those lamps and the power consumption of those lamps. Accordingly, there still exists a need in the flat panel liquid crystal display art for an improved lighting/optical arrangement which provides a bright, uniform image of high contrast and capable of being viewed over a wide viewing angle, while maintaining a narrow profile and minimizing power consumption and thermal inconveniences.

BRIEF SUMMARY OF THE INVENTION

There is disclosed herein an improved backlit electronic display and specifically a liquid crystal display adapted to provide an image to one or more remotely positioned observers. The improved liquid crystal display is defined by a matrix array of rows and columns of liquid crystal picture elements spacedly disposed from one side of a light source, and means for collimating light operatively disposed between said light source and said rows and columns of liquid crystal picture elements. The improvement in the display of the instant invention residing in the incorporation therein of an image splitting means adapted to enlarge the area effectively illuminated by said light source, said image splitting means and said collimating means forming an integral image splitting/collimating lens. In this manner, a bright, uniform distribution of light is provided in a low profile display.

The display preferably includes a backreflector which is operatively disposed on the side of the light source opposite the image splitting/collimating lens. The display preferably further includes means for diffusing light emanating from the light source, the light diffusing means operatively disposed between said image splitting/collimating lens and said rows and columns of liquid crystal picture elements. In one preferred embodiment, the light source is configured as a single, elongated, serpentine, tubular lamp arranged in a series of elongated parallel lobes. In a second, equally preferred embodiment, the light source may be configured as a plurality of discrete tubular lamps, said lamps defining a given lighting configuration. Regardless of whether the light source defines a lighting configuration formed of a single elongated tubular lamp or a plurality of discrete lamps, said image splitting/collimating lens will comprise a substantially planar thin film sheet having multi-faceted prisms formed on one surface thereof.

The prisms formed on said image splitting/collimating lens are operatively disposed so as to provide an image splitting effect in one dimension of the sheet. In alternative embodiments, the image splitting/collimating film may either be laminated onto a substrate or actually formed thereupon. The substrate is thin and transparent and formed of glass, a ceramic or a synthetic plastic resin. Regardless of the material from which the substrate is fabricated, the direction in which the image splitting/collimating lens is adapted to split radiation corresponds to the longitudinal dimension of the light source. More specifically, rays of light emanating from said light source are refracted on each side of said image splitting/collimating lens to provide two similar images thereof. Of course, the distance between the two similar images is controlled by the operative spacing of s id image splitting/collimating means from said light source. In a preferred embodiment, the image splitting/collimating means is operatively spaced from said light source so that said two similar images are operatively disposed immediately adjacent to one another.

It must be emphasized that the improved backlighting arrangement of the instant invention will operate with equal effectiveness in passive displays as well as in active matrix electronic displays. In such active matrix liquid crystal displays, each picture element will include a pair of electrodes having liquid crystal material operatively disposed therebetween and at least one threshold device. The threshold devices may either be diodes or field effect transistors. Where two threshold devices are employed, they are electrically coupled together at a common node in non-opposing series relationship. The threshold devices preferably comprise diodes formed from deposited thin film layers of amorphous silicon alloy material of p-i-n construction.

In one final embodiment of the invention, the light source can be defined by a plurality of lamps operatively disposed in two orthogonal directions. In such an embodiment, it is necessary to employ a set of two image splitting/collimating lenses. One of those image splitting/collimating lenses will be operatively disposed on top of the second and offset by 90 degrees therefrom. This combination of image splitting, light collimation and light diffusion provides for a thin and efficient assembly which yields a uniform distribution of light over the large surface areas of the display.

These and other objects and advantages of the instant invention will become apparent to the reader from a perusal of the Detailed Description Of The Invention, the Drawings and the claims, all of which follow immediately hereinafter.

DETAILED DESCRIPTION OF THE INVENTION

Disclosed as part of the instant invention is an improved backlighting assembly for an electronic display, such as a liquid crystal display and most specifically, by way of example and not by way of limitation, to an active matrix liquid crystal display for military and avionic applications. Active matrix liquid crystal displays, which operate in full color and in the transmissive mode, represent the primary choice of flat panel technologies for avionic and military applications because of their sunlight readability, high resolution, color and gray scale capability, low power consumption and thin profile. It is to be specifically noted that while an active matrix liquid crystal display will be described in detail hereinafter as a preferred embodiment, the instant invention can be used with equal advantage in any type of backlit electronic display known to routineers in the art. Therefore, the improved backlighting assembly described herein is adapted to enhance lighting parameters such as brightness, redundancy of lamps, low heat effects, while simultaneously providing a low profile to the overall depth dimension of the display structure. With the foregoing objectives clearly in mind, the improved assembly will be described in greater detail in the following paragraphs.

In order for electronic displays to gain increased acceptance in military and avionic applications, the backlighting of flat panel displays, and particularly active matrix liquid crystal displays, must be improved in light efficiency and reliability. In order for a full color liquid crystal display to possess acceptable contrast under high ambient lighting conditions, the backlighting arrangement must be bright. While current backlighting systems have the requisite light output, they still require high power (on the order of 2.4 watts/square inch) and a depth dimension of about two inches. In contrast thereto, the backlight assembly of the instant invention consumes only about 1.2 watts/square inch of power with a depth dimension of only about one inch. In addition, this design increases lamp life, a critical parameter in the design and successful marketing of electronic displays, to approximately 8,000 hours or more from the typical values of about 4,000 hours exhibited by prior art lighting arrangements.

Liquid crystal displays operate as light modulators and do not emit light. Therefore, liquid crystal displays rely upon ambient illumination or backlighting to provide the light necessary for reading. Active matrix liquid crystal displays use a twisted nematic liquid crystal material and two polarizers as the optical components in the modulating mechanism. These materials, together with the color filters, result in a color display panel which can only transmit about 5% of radiation incident thereupon. Therefore, a bright backlight is necessary in order for full color displays to be clearly readable in bright ambient environments.

Figure 1:
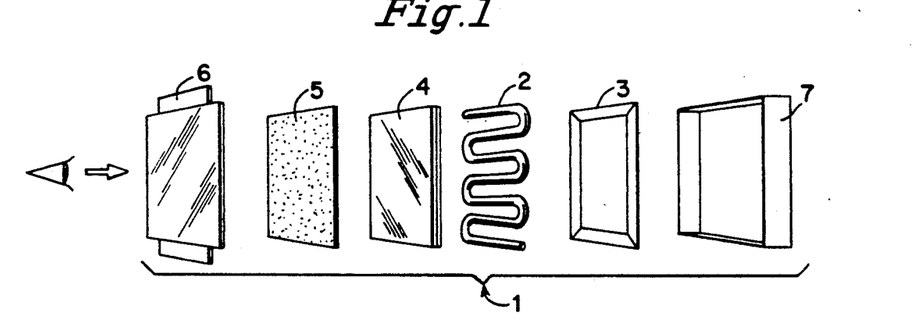
FIG. 1 is an exploded perspective view illustrating the component elements typically present in a liquid crystal display adapted for use in military and avionic applications.

All backlighting assemblies designed for active matrix liquid crystal display applications have the same basic components. More specifically, each backlighting assembly includes a light source, an optical system comprising one or more lenses for altering the nature of the light emanating from said light source, and light source control electronics (ballast). An exploded perspective view of a fluorescent lamp-based backlight assembly is illustrated in FIG. 1. The backlight assembly depicted therein is represented generally by the reference numeral and, as is typical in the industry, employs a tubular fluorescent lamp 2 as the light source. Of course, the lamp 2 may be arranged in any one of a plurality of well known configurations: it may be serpentine as shown in FIG. 1, alternatively the lamp may be "U-Shaped", or straight.

Returning now to FIG. 1, the typical backlight system further includes a backreflector 3, a lens element 4, and a diffuser 5. Of course, disposed in front of the backlight assembly 1 is a display element comprising a plurality of rows and columns of liquid crystal picture elements adapted to be illuminated by said backlight assembly. The purpose of the backreflector 3 is to redirect light which is not initially directed towards the display element so that the maximum amount of light available from a given light source is directed towards the display 6.

Generally speaking, the optical element 4 is provided to alter or enhance the quality of the light emanating from the light source. While the optical element is an important, indeed necessary, component of the backlight system, it is often the primary cause of increased profile (i.e., increased thickness) in a liquid crystal display system. This is due to the fact that in order to achieve the desired optical effect, it is often necessary to operatively space the plurality of lenses which make up the optical element a preselected distance from one another. For example, a collimating lens such as a Fresnel lens is characterized by a focal length which defines the operative spacing from the light source necessary for the lens to effectively collimate the light. This spacing, along with the operative spacing required by, for example a diffuser significantly increases the profile of the backlight assembly.

It is to the end of reducing the profile of the liquid crystal display system that the instant invention is directed. This is accomplished by incorporating two necessary optical components, an image splitting lens and a collimating lens into a single, integral image splitting-/collimating lens. More particularly, the instant invention includes an image splitting lens for effectively doubling the area which the light source can uniformly and effectively illuminate. The image splitting lens is however further adapted to collimate the light emanating from the lamp 2 for uniform distribution onto the back of the matrix forming the liquid crystal display 6. There are several ways to obtain light collimation, such as, for example, through the use of various combinations of parabolic shaped reflectors and lens elements. However, the image splitting means of the instant invention is adapted to collimate light passing therethrough due to the presence of multi-faceted prisms formed on the surface thereof. Specifically, engineered facets of close tolerances will not only achieve the desired optical effect of splitting the image of the light source, but will also collimate each image.

The instant inventors have found that a material ideally suited for use as an image splitting/collimating lens is Optical Lighting Film (registered Trademark of 3M Scotch) which is subsequently laminated onto a transparent substrate such as glass, other ceramic or a synthetic plastic resin. By employing an integrally formed image splitting/collimating lens it is thus possible to achieve two desired optical effects with a decrease in the profile of the display as compared to other non-integrally formed optical systems. Indeed, since the distance between the two similar images provided by the image splitting lens is controlled by the operative spacing of the lens from the light source (i.e, the more distant the lens from the light source, the farther apart said two images appear) and since it is desired that the distance between the two images be controlled so that said two images are immediately adjacent one another, it is possible, indeed desirable to dispose the image splitting-/collimating lens in close proximity to the light source 2.

Returning now to FIG. 1, a diffuser 5 is provided to scatter the collimated light so that it will illuminate the display matrix 6 in all directions and provide acceptable off axis (wide angle) viewing. However due to the high degree of uniformity of light provided by the image splitting/collimating lens it is not necessary to diffuse the light to the extent necessary in prior art backlight assemblies, and thus the profile of the backlight assembly is further reduced. The backlight assembly 1 further includes lamp control electronics having provisions for lamp starting, a ballast 7 and dimming circuitry.

Figure 2A:
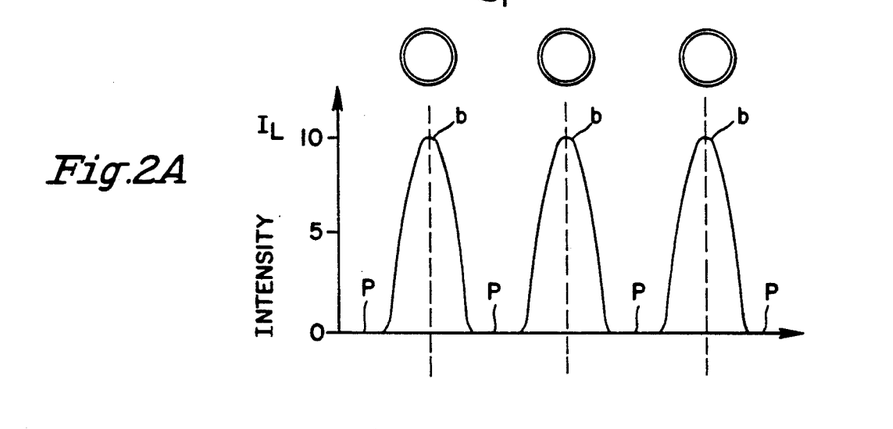
FIG. 2A is a graph of light intensity distribution in which the intensity of illumination is plotted o the ordinate and the horizontal position across the viewing surface of an electronic display of the type illustrated in FIG. 1 is plotted on the abscissa.

The light output of the light source 2 disposed behind prior art assemblies such as the liquid crystal display 6 of FIG. 1 is not uniform and will be dependent upon the configuration of the lamps employed and the type of optical system if any, employed. FIG. 2A illustrates the distribution of light intensity directly in front of the serpentine arrangement of fluorescent lamps 2 depicted in FIG. 1, as unenhanced by an optical system (i.e., without any collimating, image splitting or diffusing elements). As can be easily discerned from FIG. 2A, unenhanced light emanating from the light source will inevitably lead to areas of localized high intensity of illumination on the array of liquid crystal pixels. This, of course, results in local bright spots, such as b, and local pale spots, such as p, in the displayed image and therefore degraded image quality.

Figure 2B:
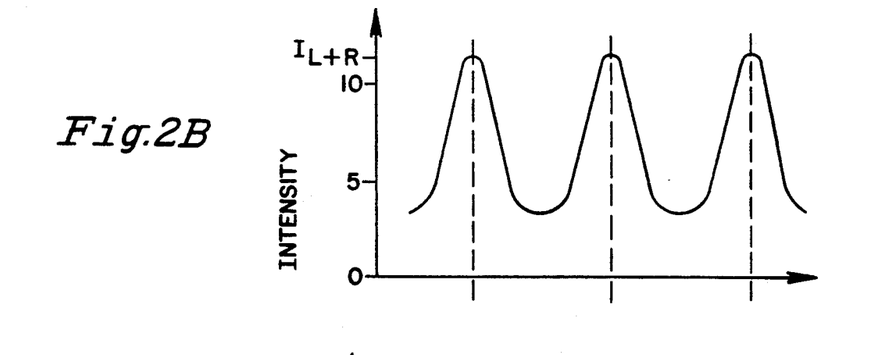
FIG. 2B is a graph of light intensity distribution in which the intensity of illumination is plotted on the ordinate and the horizontal position across the viewing surface of an electronic display of the type illustrated in FIG. 1, including a reflector, is plotted on the abscissa.
Figure 2C:
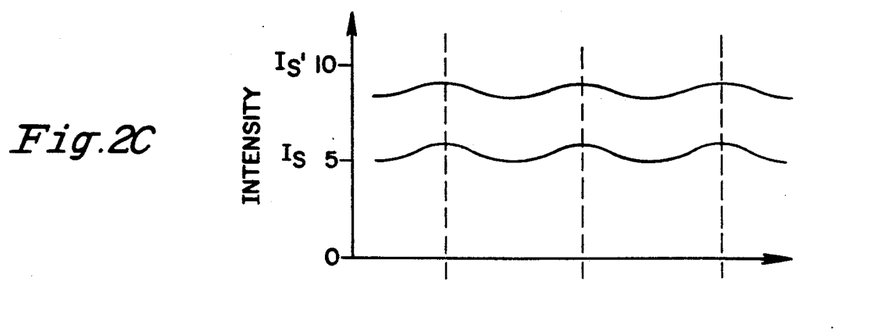
FIG. 2C is a graph of light intensity distribution in which the intensity of illumination is plotted on the ordinate and the horizontal position across the viewing surface of an electronic display is plotted on the abscissa, and illustrating in curve I a conventional backlighting arrangement and in curve I' the improved backlighting arrangement of the instant invention.

Of course, it is one of the purposes of an optical system, such as 4 in FIG. 1, to redistribute the intensity of radiation from the high intensity areas to the areas of lower intensity while maintaining the total integrated light output from the lamp assembly 2. FIG. 2B depicts the typical distribution of light intensity of the serpentine arrangement of fluorescent lamps 2 of FIG. 2A to which a backreflector 3 has been added. Acceptable uniformity across the viewing surface of the liquid crystal display requires optimization of the backreflector 3 in conjunction with the other optical components. Current backlighting arrangements have been configured to provide acceptable uniformity thereacross, but they lose about one-half of the energy emanating from the lamps. The curve marked as I in FIG. 2C illustrates an intensity of illumination that can be expected from current backlighting designs. In the detailed description which follows hereinafter, a highly efficient optical system will be disclosed that maximizes light output while achieving a high degree of uniformity across the viewing screen, in the manner shown by the curve I'.

The lamp and optical configurations are critical elements in the design of such systems because the characteristics thereof determine the final performance parameters and the overall structural profile of the display. In achieving an optical system characterized by such performance, fluorescent lamps will be capable of operation at a substantially reduced power level, which results in prolonged life. This also reduces heat build-up, thereby reducing thermal management requirements and permitting a more compact design. These improvements not only result in an improved backlighting arrangement in terms of uniformity and intensity, but one that is more reliable and less expensive to build and maintain.

Figure 3:
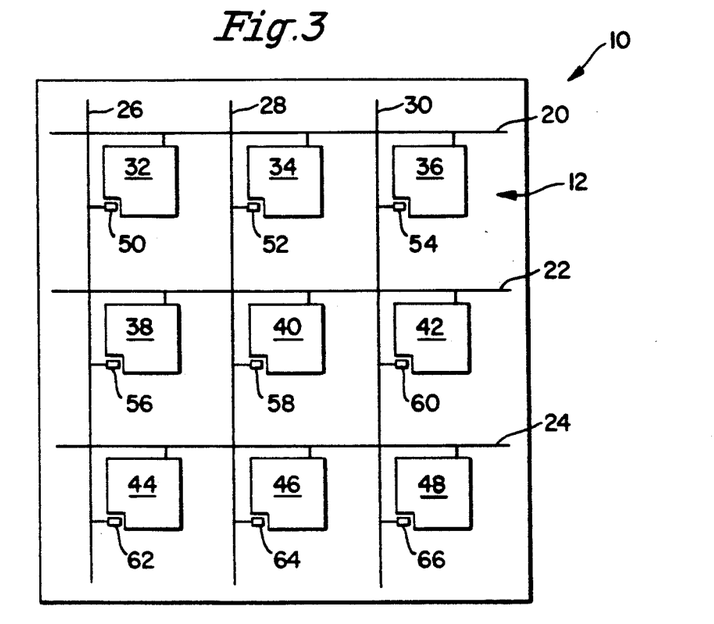
FIG. 3 is a stylistic front elevational view of the matrix array of rows and columns of liquid crystal picture elements of the active matrix embodiment of the electronic display o the instant invention schematically illustrating the manner in which the threshold switching elements are operatively disposed between the address lines and one of the picture element electrodes.

Referring now to FIG. 3, there is depicted therein a matrix array of rows and columns of discrete liquid crystal display picture elements, said matrix array being generally designated by the reference numeral 10. Each liquid crystal display picture element, or pixel, 12 includes two spacedly disposed pixel electrode plates with a light influencing material, such as a liquid crystal composition, operatively captured therebetween. (The electrode plates and the light influencing material will be discussed in detail with respect to FIG. 5.) Each of the pixels 12 further includes a threshold switching device or a plurality of threshold switching devices for selectively applying an electric field across the liquid crystal composition when the electric field exceeds a predetermined threshold value.

More specifically, the matrix array 10 which defines the liquid crystal display of the instant invention includes a first set of X address lines 20, 22 and 24: a second set of Y address lines 26, 28 and 30; and a plurality liquid crystal picture elements 32, 34, 36, 38, 40, 42, 44, 46 and 48. The display further includes at least one isolation or addressing element 50, 52, 54, 56, 58, 60, 62, 64 and 66 operatively associated with and electrically connected to each respective one of the picture elements. As should be readily apparent to the reader from even a cursory review of FIG. 1, the X address lines 20, 22 and 24 and the Y address lines 26, 28 and 30 cross over one another at an angle so as to define a plurality of spaced crossover points associated with respective ones of the liquid crystal picture elements 32-48. The picture elements are formed on a transparent substrate, such as glass, and are distributed thereover in spacedly disposed relation so as to define interstitial spaces therebetween.

Figure 4:
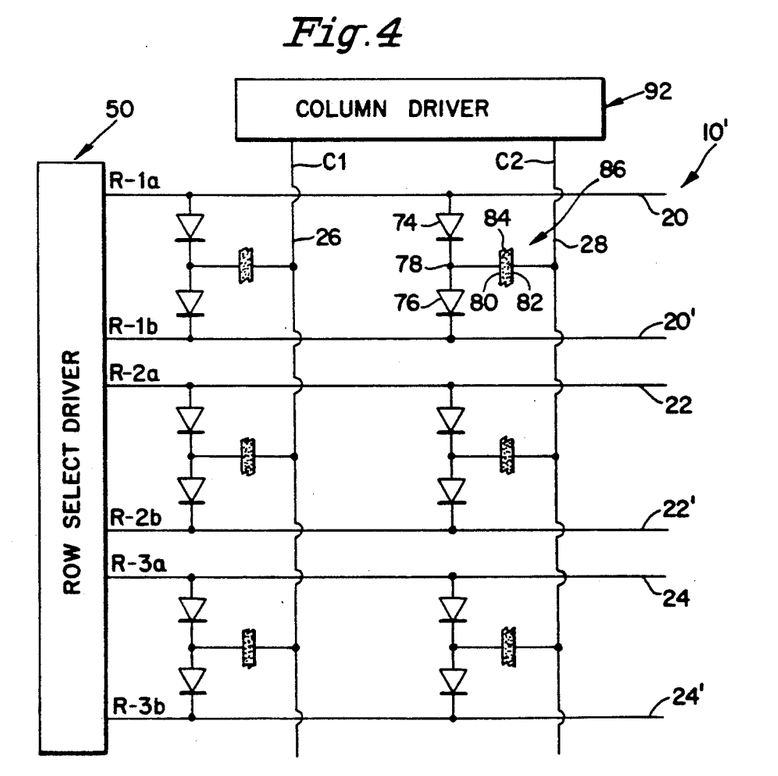
FIG. 4 is an equivalent circuit diagram of the active matrix embodiment of the array of FIG. 3, illustrating the relationship between the liquid crystal picture elements and the anode-to-cathode connected diodes by which individual ones of the picture elements schematically depicted in FIG. 3 are addressed.

As can be ascertained from a perusal of FIGS. 3 and 4, each of the threshold devices 50-66 is preferably coupled in nonopposing series relation with a first one of the pixel electrodes. This type of switching arrangement will now be described in greater detail with respect to FIG. 4. In FIG. 4, the matrix array 10' includes a plurality of substantially parallel address line pairs 20, 20', 22, 22', 24 and 24' which are the row select lines and a plurality of substantially parallel column address lines 26 and 28. The column address lines 26, 28, and 30 cross the row select address line pairs at an angle and are spaced from the row select address line pairs to form a plurality of crossover points therewith. Preferably, the column address lines cross the row select line pairs at an angle which is substantially perpendicular thereto.

Since, as mentioned hereinabove, each of the pixels are identical, only pixel 12 will be described in detail in the following paragraphs. Pixel 12, as can be seen from the figures, includes a pair of threshold devices 74 and 76 which are electrically coupled together at common node 78. The threshold devices 74 and 76 are preferably diodes and are electrically coupled together in nonopposing series relationship between the row select address line pair 20 and 20'. Although the threshold devices, in accordance with the preferred embodiment of the invention are diodes, said devices can be of any type which provides a high impedance to current flow when reverse biased and a comparatively low impedance to current flow when forward biased. Therefore, any bidirectional threshold switch or field effect transistor can be utilized with equal advantage. Of course, more conventional electrical interconnections would be employed with field effect transistors.

The picture element or pixel 12 further includes a pair of electrode plates 80 and 82 which are spaced apart and facing one another. Operatively disposed in the space between the electrodes 80 and 82 is a light influencing material 84. The term "light influencing material" is defined and will be used herein to include any material which emits light or can be used to selectively vary the intensity, phase, or polarization of light either being reflected from or transmitted through the material. In accordance with the preferred embodiment of the invention, the light influencing material is a liquid crystal display material, such as a nematic liquid crystal material. In any event, the electrodes 80 and 82 with the liquid crystal material 84 disposed therebetween form a storage element 86 (or capacitor) in which electric charge can be stored. As illustrated, the storage element 86 is coupled between the common node 78, formed by the electrically connected diodes 74 and 76, and the column address line 26.

Still referring to FIG. 4, the display 10 further includes a row select driver 90 having outputs R-1a, R-1b, R-2a, R-2b, R-3a, and R-3b electrically coupled to the row select line pairs 20, 20', 22, 22', 24, and 24'. The row select driver 50 provides drive signals at the outputs thereof to apply first operating potentials which are substantially equal in magnitude and opposite in polarity between the row select address line pairs to forward bias the threshold devices to in turn facilitate the storage of electric charge in the storage elements coupled thereto. The row select driver also applies second operating potentials which are substantially equal in magnitude and opposite in polarity between the row select address line pairs to reverse bias the threshold devices to facilitate the retention of the electric charge stored in the storage elements coupled thereto.

Lastly, the electronic display 10 includes a column driver 92. The column driver 92 includes a plurality of outputs, C1 and C2, which are coupled to the column address lines 26 and 28 respectively. The column driver is adapted to apply a charging potential to selected ones of the column address lines for providing electric charge to be stored in selected storage elements during the application of the first operating potentials to the row select address line pairs by the row select driver 50.

It is preferred that the matrix array of rows and columns of picture elements that combine to make up the improved electronic display 10 of the instant invention utilize a "balanced drive" scheme for addressing each discrete one of the pixels thereof. In this driving scheme, the operating potentials applied to the row select address line pairs are always substantially equal but opposite in polarity. Assuming that the current-voltage characteristics of each of the diodes are substantially equal, a voltage of substantially zero volts will be maintained at the common node 78, at least when the diodes are forward biased. Thus, the voltage applied on the column address line 26 to charge storage element 86 no longer needs to take into account the voltage drop across and/or parasitic charge build-up on one or both of the diodes 74 and 76. Therefore, each pixel in the matrix array of rows and columns may be charged to a known and repeatable value regardless of its position in that matrix array. This permits improved gray scale operation resulting in at least 15 levels of gray scale in large area active matrix displays of the twisted nematic liquid crystal type using normal fluorescent back illumination. The pixels can also be charged more rapidly since the retained charge in the diodes associated with each pixel when they are reverse biased need not be initially dissipated to charge the storage elements. This is because this charge is dissipated when the diodes are first forward biased. A complete description of this driving scheme can be found in U.S. Pat. No. 4,731,610 issued on Mar. 15, 1988 to Yair Baron et al and entitled "Balanced Drive Electronic Matrix System And Method Of Operating The Same", the disclosure of which is incorporated herein by reference.

Figure 5:
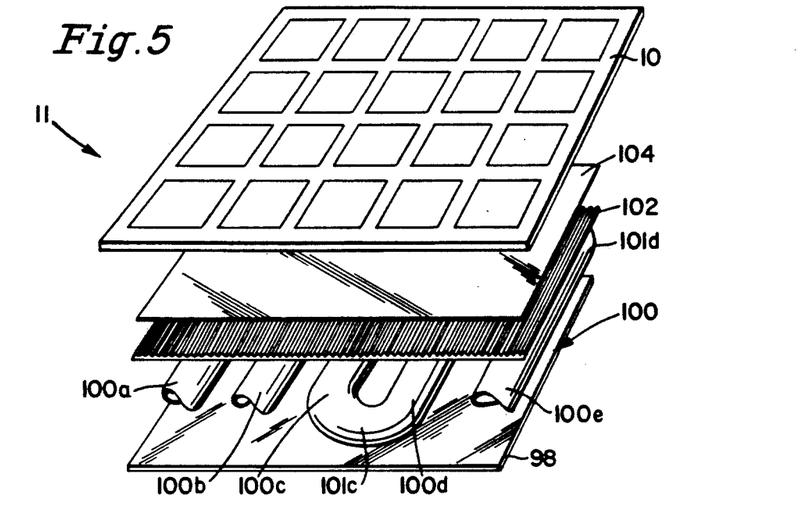
FIG. 5 is a fragmentary perspective view illustrating the relative disposition of one preferred embodiment of the image splitting/collimating lens array of the instant invention relative to a first embodiment of an axially aligned array of tubular lamps.

Turning now to FIG. 5, there is depicted in a fragmentary perspective view, one preferred embodiment of the instant invention. In this embodiment of the invention, the image splitting/collimating lens 102 is operatively disposed so as to provide for a low profile electronic display assembly 11. The low profile or depth dimension of the display is especially important and is dependent on the type of lighting assembly, the material from which the threshold devices are fabricated, the on-board electronics, the multiplexing schemes, and most importantly, the optical arrangement by which light is diffused, collimated and transmitted to the viewing audience. It is, inter alia, the depth dimension of liquid crystal displays that has been significantly improved by the inventive concept set forth herein.

There are four basic elements which combine to form the electronic display 11 depicted in FIG. 5. The uppermost element is the generally rectangularly-shaped glass panel 10 upon which the rows and columns of active matrix liquid crystal picture elements as well as the associated drive circuitry, described in the preceding paragraphs, are disposed. The lowermost element is the thin, generally rectangularly-shaped back reflector panel 98 upon the interior surface of which one or more thin film layers of highly reflective material, such as aluminum or silver and a light transparent material having a low index of refraction, are deposited. Disposed immediately above the highly reflective panel 98 is an array of light sources 100 from which radiation emanates and either passes directly towards the matrix array of picture elements or is reflected off of the highly reflective panel and then passes upwardly toward said matrix array. Finally, the improved image splitting/collimating lens 102 of the instant invention is operatively located between the array of light sources 100 and the matrix array of picture elements 10. It is the combination of these elements which define the profile, preferably the low profile, of the electronic display of the instant invention.

More specifically, it is important to note that lighting is one of the critical parameters which is employed in assessing the visual appearance of a liquid crystal display. Not only is it essential that the image of the display appear clear and bright to the viewers thereof, but it is also important that the image be substantially as clear to viewers disposed at an angle relative to the vertical plane of the viewing screen of the display. The structural and optical relationship existing between the array of light sources and the image splitting/collimating lens 102 helps to determine the clarity and viewing angle of the display.

In the preferred embodiment of the invention illustrated in FIG. 5, the array of light sources 100 is configured as one elongated, serpentine fluorescent lamp (although it must be appreciated that a plurality of discrete elongated tubular lamps could be employed without departing from the spirit or scope of the instant invention) arranged in a specific pattern or lighting configuration and having each section of lamp disposed in a generally horizontal plane. More specifically, the array, regardless of configuration, will be arranged to uniformly distribute radiation emanating therefrom over the entire surface area of the matrix of rows and columns of picture elements 105. To this end, the lighting array is shaped in a serpentine pattern which may include a plurality of elongated lamps, such as 100a-100e, each lamp of which has a longitudinal axis parallel to the longitudinal axis of the other major lamp sections The length of each longitudinal lamp axis is generally coextensive with the length dimension of the matrix array of picture elements. The configuration of the lighting array 100 also includes curved end sections, such as 101c-101d. The number of the elongated axial sections of the lamps and the number of the curved end sections of the lamps must be sufficient to bathe the entire width dimension of the matrix array of picture elements 105 with a uniform shower of illumination.

The image splitting/collimating lens 102 is formed as an integral unit, vis-a-vis, prior art image splitters and collimators which were formed as two distinct elements. The integrally formed image splitting/collimating lens is, as discussed hereinabove, fabricated of Optical Lighting Film (registered Trademark of 3M Scotch) which is subsequently laminated onto a transparent substrate such as glass, a ceramic or plastic. By employing an integrally formed image splitting/collimating lens it is thus possible to achieve two desired optical effects without an increase in the profile of the display. Indeed, since the distance between the two similar images provided by the image splitting effect of the image splitting/collimating lens is controlled by the operative spacing of the lens from the light source (i.e, the more distant the lens 102 from the light source, the farther apart said two images appear) and since it is desired that the distance between the two images be controlled so that said two images are immediately adjacent one another, it is possible, indeed desirable, to dispose the image splitting/collimating lens in close proximity to the light source 100. As is illustrated in FIG. 5, the image splitting/collimating lens can be used in conjunction with a diffuser 104 to further enhance the uniformity of the light emanating from the light source 100.

Figure 6:
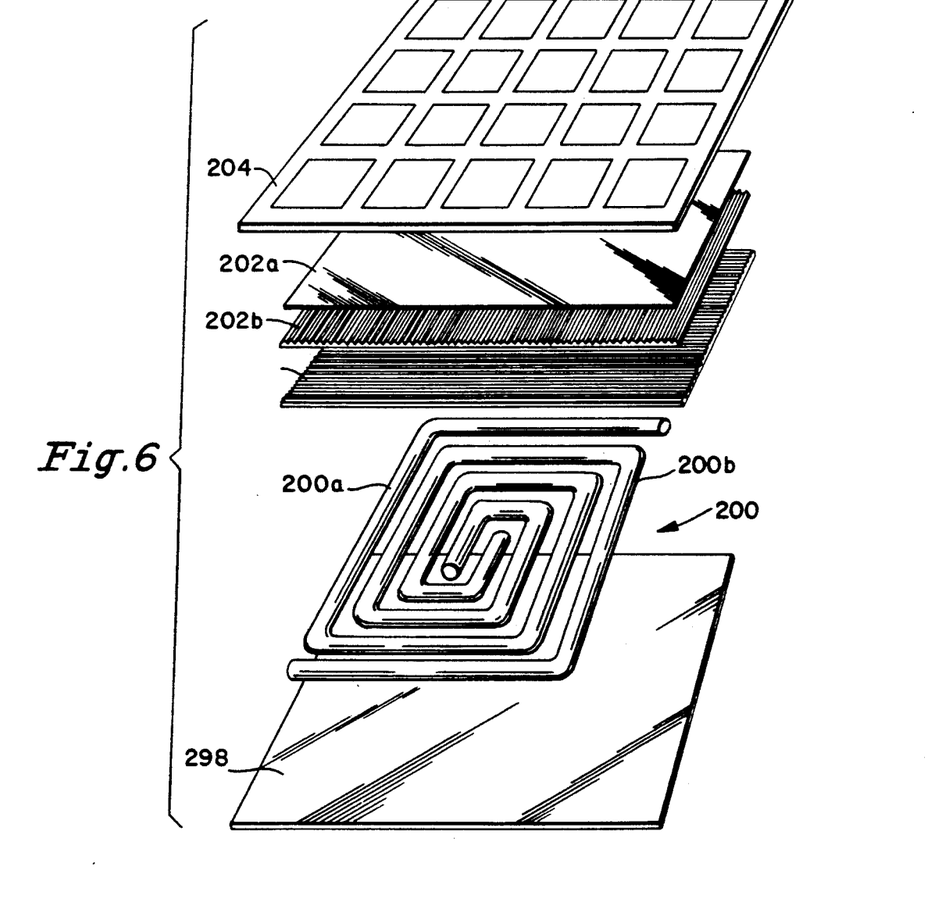
FIG. 6 is a fragmentary perspective view illustrating the relative disposition of the image splitting/collimating lens array of the instant invention relative to a second embodiment of a square helical array of tubular lamps.

In a second preferred embodiment of the invention illustrated in FIG. 6, the array of light sources 200 is configured as square, helical fluorescent lamp (although it must be appreciated that a plurality of discrete elongated tubular lamps could be employed without departing from the spirit or scope of the instant invention) arranged in a specific pattern or lighting configuration and having each section of lamp disposed in a generally horizontal plane. As stated hereinabove, the array, regardless of configuration, will be arranged to uniformly distribute radiation emanating therefrom over the entire surface area of the matrix of rows and columns of picture elements 205. To this end, the lighting array is shaped in a square, helical pattern which may include at least a pair of squarely configured, elongated lamps, such as 200a-200b, each portion of each squarely configured lamp being parallel to the squarely configured portions of the other lamp. The configuration of the lighting array 200 also includes curved sections, such as 201c-201d. The number of the elongated portions of the lamps is generally equal to eight in the square helical configuration.

The image splitting/collimating lens 202 is formed as an integral unit, vis-a-vis, prior art image splitters and collimators which were formed as two distinct elements. The integrally formed image splitting/collimating lens is, as discussed hereinabove, fabricate of Optical Lighting Film (registered Trademark of 3M Scotch) which is subsequently laminated onto a transparent substrate such as glass, a ceramic or plastic. By employing an integrally formed image splitting/collimating lens it is thus possible to achieve two desired optical effects without an increase in the profile of the display. Indeed, since the distance between the two similar images provided by the image splitting effect of the image splitting/collimating lens is controlled by the operative spacing of the lens from the light source (i.e, the more distant the lens 202 from the light source, the farther apart said two images appear) and since it is desired that the distance between the two images be controlled so that said two images are immediately adjacent one another, it is possible, indeed desirable, to dispose the image splitting/collimating lens in close proximity to the light source 200. As is illustrated in FIG. 6, the image splitting/collimating lens can be used in conjunction with a diffuser 204 to further enhance the uniformity of the light emanating from the light source 200.

Figure 7:
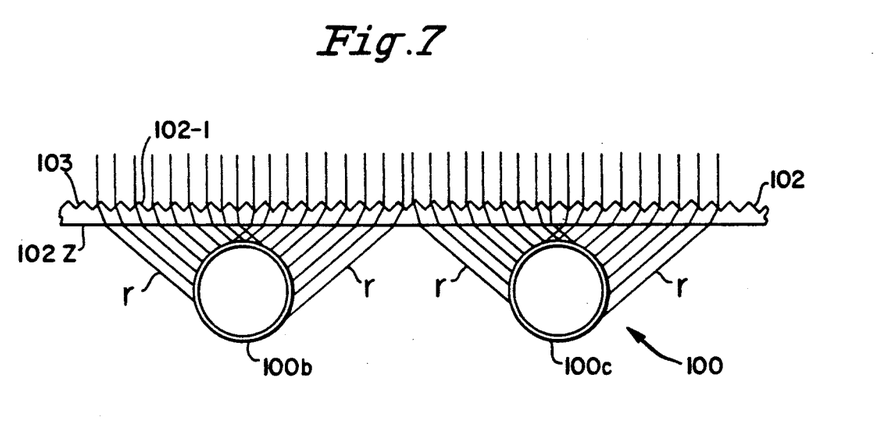
FIG. 7 is a cross-sectional view of FIG. 5 and illustrating the manner in which rays of light emanating from the axially aligned lighting configuration of FIG. 5 are split and collimated by the optical media of the image splitting/collimating lens array of the instant invention.

Turning now to FIG. 7, there is depicted therein a cross-sectional view of FIG. 5, said cross-sectional view provided to demonstrate the manner in which rays of light "r" emanating from the lamps 100b–100c of the lighting configuration 100 are collimated to present a sharp image to the viewing audience of the liquid crystal display of the instant invention. More particularly, there is depicted a plurality of lamps, such as 101b, 101c, and 101d, of the embodiment of the lighting configuration wherein the longitudinal axes thereof are disposed in substantially parallel alignment. As can be seen from a perusal of FIG. 7, the rays of light "r" emanating from the three parallel, but spacedly disposed lamps are directed upwardly through the relatively thin image splitting/collimating lens 102. The upper surface, the surface opposite the light source 100, of the image splitting/collimating lens 102 is engineered so as to comprise a series of aligned multi-faceted prisms 103. The prisms 103 are aligned such that the longitudinal extents thereof are substantially parallel to the longitudinal extents of the substantially parallel lamps 100a and 100b. At both the planar air-to-material interface 102z and the faceted L material-to-air interface 102y thereof, the rays of light are collimated and transmitted to the viewers in that collimated fashion. Note that for purposes of illustrating the collimating effect of the lens array of the instant invention, neither the reflector plate 98 nor the matrix array 10 of rows and columns of liquid crystal picture elements are depicted in FIG. 7. Of course, it is the aligned facets of said prisms 103 that provide the image splitting effect which is critical to the improved performance provided by the instant invention.

Figure 8:
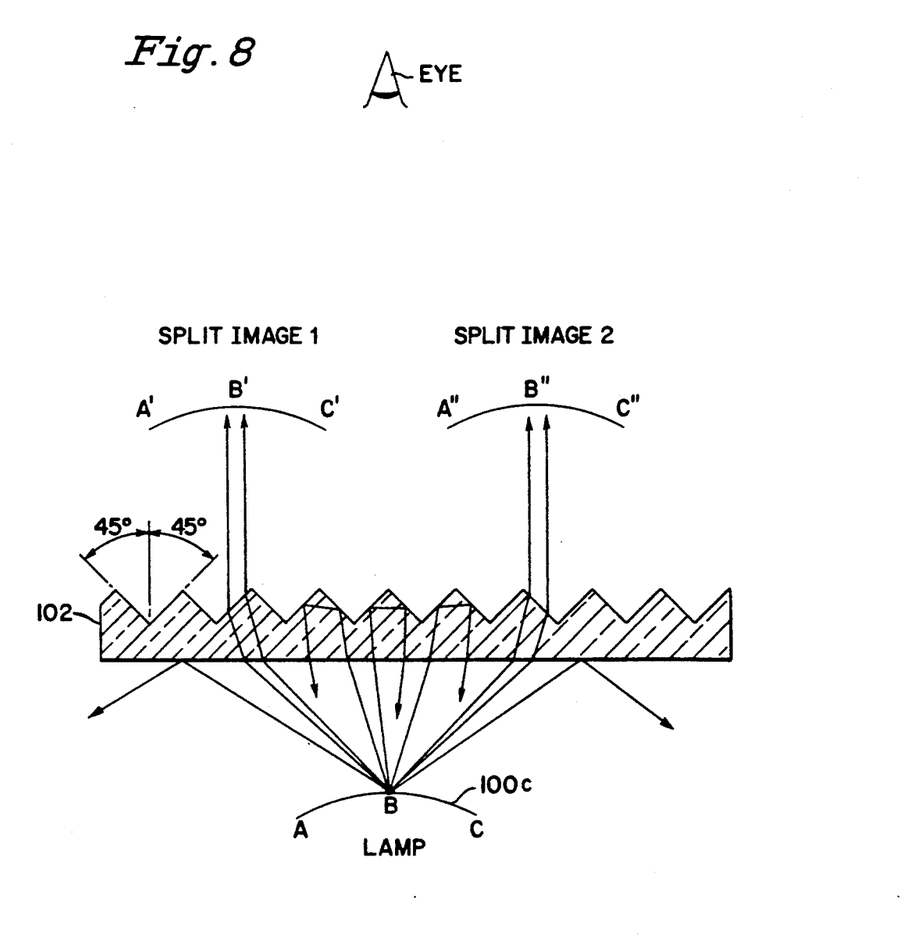
FIG. 8 is a partial cross-sectional schematic view of FIG. 7 illustrating the manner in which the rays of light emanating from the light source are refracted on each side of the integral image splitting/collimating lens to provide two similar images thereof.

FIG. 8 is presented to schematically illustrate how the above-referenced aligned facets of the prisms 103 inherently operate to provide the image splitting effect. This, of course, also illustrates the inherent characteristics of operation of the aforesaid 3M Optical Lighting Film when used in this invention. As illustrated with reference to a segmented arc of lamp 100c having a mid-point B and extremities A and C (these points being designated for convenience of illustration, it being understood that lamp 100c is a circular tube), certain rays of light are reflected backwardly while others are allowed to exit in collimated fashion from lens 102. To the observer located at "eye" this inherently results in a "split image" 1 and 2, the spacking of which, as aforesaid, is governed by the distance between the lamp 100c, and the lens 102.

While the foregoing paragraphs have described the inventive concept set forth in the this specification, the instant inventors do not intend to have the disclosed invention limited by the detailed embodiments, drawings or description; rather, it is intended that the instant invention should only be limited by the scope of the claims which follow hereinafter, as well as all equivalents thereof which would be obvious to those routineers of ordinary skill in the art.

What is claimed is:

1. In a backlit liquid crystal display which includes a source of light; a matrix array of rows and columns of liquid crystal picture elements spacedly disposed from one side of said light source; and means for collimating light, said collimating means operatively disposed between said light source and said matrix array of rows and columns of liquid crystal picture elements; said liquid crystal display capable of providing an image to a remotely positioned observer; the improvement comprising, in combination:

an integral collimating and image splitting means for collimating light from said light source and for refracting light rays emanating from said light source to provide two similar images thereof, thereby enlarging the area effectively illuminated by said light source, whereby a bright, uniform, light distribution is provided in a low profile assembly.

2. A display as in claim 1, further including a backreflector operatively disposed on the side of said light source opposite said image splitting/collimating lens.

3. A display as in claim 1, further including means for diffusing light emanating from said light source, said light diffusing means operatively disposed between said image splitting/collimating lens and said rows and columns of liquid crystal picture elements.

4. A display as in claim 1, wherein said light source is a single, elongated, serpentined, tubular lamp arranged in a series of elongated parallel lobes.

5. A display as in claim 1, wherein said light source is a multi-tube lamp array wherein each of said lamps are elongated tubular lamps arranged in substantially parallel fashion.

6. A display as in claim 1, wherein said light source is at least a pair of tubular lamps arranged in a square helical configuration.

7. A display as in claim 1, wherein said image splitting/collimating lens comprises a film having prisms formed on one face thereof.

8. A display as in claim 7, wherein the image splitting/collimating film is laminated to a substrate.

9. A display as in claim 8, wherein said substrate is a thin transparent substrate.

10. A display as in claim 9, wherein the substrate is glass.

11. A display as in claim 1 wherein said integral collimating and image splitting means includes a thin film having faceted prisms formed on one face thereof and wherein said light rays are refracted by the said facets of said prisms.

12. A display as in claim 1, wherein the distance between said two similar images is controlled by the operative spacing of said image splitting/collimating means from said light source.

13. A display as in claim 12, wherein said image splitting/collimating means is operatively spaced from said light source so that said two similar images are immediately adjacent one another.

14. A display as in claim 1, wherein the liquid crystal display is an active matrix liquid crystal display.

15. A display as in claim 1, wherein each liquid crystal picture element comprises a pair of electrodes having liquid crystal material disposed therebetween and at least one threshold device connected at one of the terminals thereof to one of said electrodes.

16. A display as in claim 15, wherein a pair of threshold devices are provided, said threshold devices electrically coupled together at a common node in nonopposing, series relationship.

17. A display as in claim 15, wherein said at least one threshold device comprises a transistor formed from deposited layers of semiconductor material.

18. A display as in claim 15, wherein the threshold devices comprise diodes formed from deposited layers of semiconductor material.

19. A display as in claim 18, wherein the semiconductor material is an amorphous silicon alloy material.

20. A display as in claim 1, wherein the light source comprises lamps arranged in two orthogonal directions.

21. A display as in claim 20, further including two image splitting/collimating lenses arranged to provide perpendicular image splitting effects.

22. A display as in claim 21, wherein said image splitting/collimating lenses each comprise thin films disposed one atop the other, and wherein the dimension in which one of said image splitting/collimating lenses provides an image splitting effect is offset by 90 degrees relative to the other lens.

* * * * *